United States Patent
Geng et al.

(10) Patent No.: US 12,212,809 B2
(45) Date of Patent: Jan. 28, 2025

(54) IMAGE DATA PROCESSING DEVICE AND METHOD, AND DISPLAY DEVICE INCLUDING AN IMAGE DATA PROCESSING DEVICE

(71) Applicant: BOE Technology Group Co., Ltd., Beijing (CN)

(72) Inventors: Lihua Geng, Beijing (CN); Yanfu Li, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 329 days.

(21) Appl. No.: 17/755,372

(22) PCT Filed: Jun. 11, 2021

(86) PCT No.: PCT/CN2021/099704
§ 371 (c)(1),
(2) Date: Apr. 30, 2022

(87) PCT Pub. No.: WO2022/022106
PCT Pub. Date: Feb. 3, 2022

(65) Prior Publication Data
US 2022/0345769 A1 Oct. 27, 2022

(30) Foreign Application Priority Data
Jul. 30, 2020 (CN) .......... 202010750943.1

(51) Int. Cl.
G06T 1/60 (2006.01)
H04N 7/01 (2006.01)
H04N 21/4363 (2011.01)

(52) U.S. Cl.
CPC ......... H04N 21/43635 (2013.01); G06T 1/60 (2013.01); H04N 7/0127 (2013.01)

(58) Field of Classification Search
None
See application file for complete search history.

(56) References Cited

U.S. PATENT DOCUMENTS 5,289,516 A * 2/1994 Kimura ............... H03K 23/665
377/41
6,469,746 B1 10/2002 Maida
(Continued)

FOREIGN PATENT DOCUMENTS

CN 101286314 A 10/2008
CN 102270444 A 12/2011
(Continued)

OTHER PUBLICATIONS

International Search Report & Written Opinion mailed Sep. 10, 2021, regarding PCT/CN2021/099704; English translation attached.
(Continued)

*Primary Examiner* — Joni Hsu
(74) *Attorney, Agent, or Firm* — Intellectual Valley Law, P.C.

(57) ABSTRACT

The present disclosure provides an image data processing device, an image data processing method and a display device. The image data processing device includes: a plurality of writing controllers corresponding to a plurality of image blocks into which an input image is divided, and each configured to obtain input data of one image block in each input image, determine a frame address of the input data stored in a memory, and transmit the input data to the memory in accordance with the determined frame address; and a plurality of reading controllers, each reading controller corresponding to one image block into which an output image is divided, and configured to determine a frame address of the output data of one image block in ach output (Continued)

image in the memory, and read output data from the memory in accordance with the determined frame address.

18 Claims, 7 Drawing Sheets

(56) References Cited

U.S. PATENT DOCUMENTS

| | | | | |
|---|---|---|---|---|
| 2005/0093886 A1* | 5/2005 | Kubota | ................ | H04N 1/3872 |
| | | | | 345/619 |
| 2005/0231617 A1* | 10/2005 | Kitani | .................... | H04N 9/646 |
| | | | | 348/E9.042 |
| 2008/0089426 A1* | 4/2008 | Wang | ..................... | H04N 19/44 |
| | | | | 375/240.24 |
| 2008/0100881 A1* | 5/2008 | Yamada | ............... | H04N 1/2032 |
| | | | | 358/472 |
| 2008/0126621 A1* | 5/2008 | Huang | ...................... | G06T 1/60 |
| | | | | 710/52 |
| 2008/0204464 A1 | 8/2008 | Roh | | |
| 2014/0043343 A1 | 2/2014 | Iwai et al. | | |
| 2017/0300271 A1* | 10/2017 | Ohwa | .................. | G06F 3/0659 |
| 2018/0063498 A1 | 3/2018 | Duan | | |
| 2018/0131981 A1 | 5/2018 | Jeong et al. | | |
| 2021/0056938 A1 | 2/2021 | Ma et al. | | |

FOREIGN PATENT DOCUMENTS

| | | | |
|---|---|---|---|
| CN | 102510493 | A | 6/2012 |
| CN | 104932994 | A | 9/2015 |
| CN | 105245759 | A | 1/2016 |
| CN | 205265822 | U | 5/2016 |
| CN | 105704407 | A | 6/2016 |
| CN | 105872432 | A | 8/2016 |
| CN | 107277595 | A | 10/2017 |
| CN | 110460784 | A | 11/2019 |
| CN | 110933255 | A | 3/2020 |
| CN | 111885410 | A | 11/2020 |
| JP | 107129460 | A | 5/1995 |
| JP | 2001272969 | A | 10/2001 |
| JP | 2018082382 | A | 5/2018 |
| KR | 20080079864 | A | 9/2008 |
| KR | 101941781 | B1 | 1/2019 |

OTHER PUBLICATIONS

First Office Action in the Chinese Patent Application No. 202010750943.1, dated Nov. 26, 2021; English translation attached.

* cited by examiner

IMAGE DATA PROCESSING DEVICE AND METHOD, AND DISPLAY DEVICE INCLUDING AN IMAGE DATA PROCESSING DEVICE

CROSS-REFERENCE TO RELATED APPLICATION

This application is the U.S. national stage application under 35 U.S.C. § 371 of International Application No. PCT/CN2021/099704 filed on Jun. 11, 2021, which claims a priority of the Chinese patent application No. 202010750943.1 filed on Jul. 30, 2020. Each of the forgoing applications is herein incorporated by reference in its entirety for all purposes.

TECHNICAL FIELD

The present disclosure relates to the field of display technology, in particular to an image data processing device, an image data processing method and a display device.

BACKGROUND

In a video display system, in order to improve the user experience, a resolution of a video increases gradually, such as a 4K high-definition video having a resolution of 4096*2160 pixels, or an 8K ultra-high-definition video having a resolution of 7680*4320 pixels. A data traffic to be transmitted and displayed continuously increases along with an increase in the resolution, so the data traffic to be transmitted and displayed form the high-definition video and the ultra-high-definition video is huge. Hence, in a transmission process of the high-definition video or ultra-high-definition video from a source end to a display device, it is necessary to use a plurality of video interfaces to transmit the video in a multichannel manner.

When the video with an ultra-high resolution is inputted into a system via the plurality of video interfaces, synchronization of video data, conversion between an image segmentation mode of the input data and an image segmentation mode of the required data and conversion of a frame rate are required to be completed for the videos inputted via different interfaces.

SUMMARY

An object of the present disclosure is to provide an image data processing device, an image data processing method and a display device, so as to ensure the synchronization of the video data, the conversion between the image segmentation mode of the input data and the image segmentation mode of the required data and the conversion of the frame rate for the videos inputted via different interfaces.

In one aspect, the present disclosure provides in some embodiments an image data processing device, including: a plurality of writing controllers configured to obtain input data of a plurality of image blocks into which a plurality of input images is divided, each writing controller being configured to obtain the input data of one image block in a plurality of image blocks into which each input image is divided, and determine a frame address of the input data stored in a memory, and transmit the input data to the memory in accordance with the determined frame address; and a plurality of reading controllers, each reading controller being associated with at least one of the writing controllers, each reading controller being configured to determine a first frame address, obtain data with a second frame address in the memory in accordance with the first frame address, and output the data with the second frame address, the first frame address being a frame address of the input data currently obtained by the writing controller associated with each reading controller in the memory, and the second frame address being spaced apart from the first frame address by a predetermined quantity of frame addresses.

In a possible embodiment of the present disclosure, each reading controller is associated with at least two writing controllers, the image block corresponding to data obtained by the reading controller includes a first image sub-block and a second image sub-block and does not include a third image sub-block and a fourth image sub-block, the image block corresponding to the input data obtained by a first writing controller associated with the reading controller includes the first image sub-block and the third image sub-block, and the image block corresponding to the input data obtained by a second writing controller associated with the reading controller includes the second image sub-block and the fourth image sub-block.

In a possible embodiment of the present disclosure, the reading controller is configured to, when data is to be obtained from the memory again after the data with the second frame address has been obtained from the memory and when the frame address of the input data currently obtained by the writing controller associated with the reading controller is still the first frame address in the memory, repeatedly obtain the data with the second frame address.

In a possible embodiment of the present disclosure, the reading controller is configured to, when data with a third frame address has not been obtained yet in the memory before the data with the second frame address is obtained from the memory, stop obtaining the data with the third frame address, and a time when the input data corresponding to the third frame address is transmitted by the writing controller associated with the reading controller is located before a time when the input data corresponding to the second frame address is transmitted.

In a possible embodiment of the present disclosure, the image data processing device further includes: a detection module configured to detect whether the input data inputted to each writing controller is abnormal data; and a first image padding module coupled to the detection module and the reading controller, and configured to obtain data outputted by each reading controller, and output the data of an image block corresponding to a target frame in the form of preset padding image data when the detection module determines that the input data of the image block inputted to the writing controller and corresponding to the target frame is the abnormal data, or configured to output the preset padding image data when the detection module determines that the input data currently inputted to the writing controller is the abnormal data and the reading controller has stopped obtaining the data in the memory.

In a possible embodiment of the present disclosure, in the case that the first image padding module is configured to obtain the data outputted by each reading controller, and output the data of the image block corresponding to the target frame in the form of the preset padding image data when the detection module determines that the input data of the image block inputted to the writing controller and corresponding to the target frame is the abnormal data, the first image padding module is further coupled to the writing controller, the writing controller is further configured to output a frame address of the image block corresponding to the target frame in the memory to the first image padding module, and the first image padding module is configured to determine the data of the image block outputted by the reading controller and corresponding to the target frame in accordance with the frame address of the image block corresponding to the target frame in the memory.

In a possible embodiment of the present disclosure, the writing controller is further configured to, when the input data is transmitted to the memory and the input data is the abnormal data, transmit the preset padding image data rather than the input data to the memory or transmit a preset character to the memory in accordance with the determined frame address.

In a possible embodiment of the present disclosure, the image data processing device further includes a second image padding module coupled to the reading controller, and configured to output the data of the image block corresponding to the target frame in the form of the preset padding image data when the output data of the image block outputted by the reading controller and corresponding to the target frame is the preset character.

In a possible embodiment of the present disclosure, when the input data has been transmitted to the target frame address in the memory and the input data fails to be received within a predetermined time period, one writing controller in the plurality of the writing controllers receives the input data again and starts to transmit the input data to the memory from a next frame address of the target frame address in the memory.

In a possible embodiment of the present disclosure, when the reading controller obtains the data with the second frame address from the memory and the frame address in the memory to which the input data is currently transmitted by the writing controller associated with the reading controller is changed into a fourth frame address, the reading controller is configured to continuously obtain the data with the second frame address until the data with the second frame address has been completely obtained, and the fourth frame address is different from the first frame address.

In a possible embodiment of the present disclosure, the image data processing device further includes an arbiter coupled to the memory, the writing controller and the reading controller, and configured to configure a transmission privilege for each writing controller to transmit the input data to the memory, and configure a transmission privilege for each reading controller to read the data from the memory.

In a possible embodiment of the present disclosure, the image data processing device further includes the memory, and the memory is a double data rate memory coupled to the arbiter via a memory controller. The arbiter is further configured to, when the transmission privilege is configured for the writing controller and the reading controller, enable a data transmission channel between each of the reading controller and the reading controller and the memory controller, and when no transmission privilege is configured to the writing controller and the reading controller, disenable the data transmission channel between each of the reading controller and the reading controller and the memory controller.

In a possible embodiment of the present disclosure, the image data processing device further includes: at least two image data input interfaces each coupled to at least one writing controller, and configured to receive a part of to-be-processed data for each input image, and perform format conversion on the part of to-be-processed data to obtain the input data to be transmitted to the writing controller coupled to the image data input interface.

In a possible embodiment of the present disclosure, the input data belonging to a same input image is transmitted by different writing controllers to a same frame address in the memory or to different frame addresses in the memory.

In another aspect, the present disclosure provides in some embodiments a display device including a display module and the above-mentioned image data processing device.

In yet another aspect, the present disclosure provides in some embodiments an image data processing method, including: obtaining, by a plurality of writing controllers, input data of a plurality of image blocks into which a plurality of input images is divided, each writing controller being configured to obtain the input data of one image block in a plurality of image blocks into which each input image is divided, determine a frame address of the input data stored in a memory, and transmit the input data to the memory in accordance with the determined frame address; and determining, by a plurality of reading controllers, a first frame address, obtaining data with a second frame address in the memory in accordance with the first frame address, and outputting the data with the second frame address, the first frame address being a frame address of the input data currently obtained by the writing controller associated with each reading controller, the second frame address being spaced apart from the first frame address by a predetermined quantity of frame addresses, and each reading controller being associated with at least one writing controller.

BRIEF DESCRIPTION OF THE DRAWINGS

In order to illustrate the technical solutions of the present disclosure or the related art in a clearer manner, the drawings desired for the present disclosure will be described hereinafter briefly. Obviously, the following drawings merely relate to some embodiments of the present disclosure, and based on these drawings, a person skilled in the art may obtain the other drawings without any creative effort.

DETAILED DESCRIPTION

In order to make the objects, the technical solutions and the advantages of the present disclosure more apparent, the present disclosure will be described hereinafter in a clear and complete manner in conjunction with the drawings and embodiments.

In order to ensure the synchronization of video data, the conversion between an image segmentation mode of input data and an image segmentation mode of required data and the conversion of a frame rate for video data inputted via different interfaces, the present disclosure provides in some embodiments an image data processing device. A plurality of writing controllers corresponds to a plurality of image blocks into which a plurality of input images is divided respectively, and a plurality of reading controllers corresponds to a plurality of image blocks into which a plurality of output images is divided. Each writing controller is configured to determine a frame address of the input data of one image block in a plurality of image blocks into which each input image is divided in the memory, and write the input data into the memory in accordance with the frame address. Each reading controller is configured to determine a frame address of the output data of the corresponding image block in the memory, and read the output data from the memory in accordance with the determined frame address. The input images are written into and read from the memory through the plurality of writing controllers and the plurality of reading controllers respectively, so it is able to ensure the synchronization of the video data, the conversion between the image segmentation mode of the input data and the image segmentation mode of the required data and the conversion of the frame rate for the video data inputted via different interfaces.

In a possible embodiment of the present disclosure, when inputting the data through the plurality of writing controllers and outputting the data through the plurality of reading controllers, the reading controller may read the data from the memory using a frame address where the data is written by the associated writing controller, and the image blocks outputted by the plurality of reading controllers belong to a same image, so as to achieve the synchronization of the output images in a simple manner.

Figure 1:
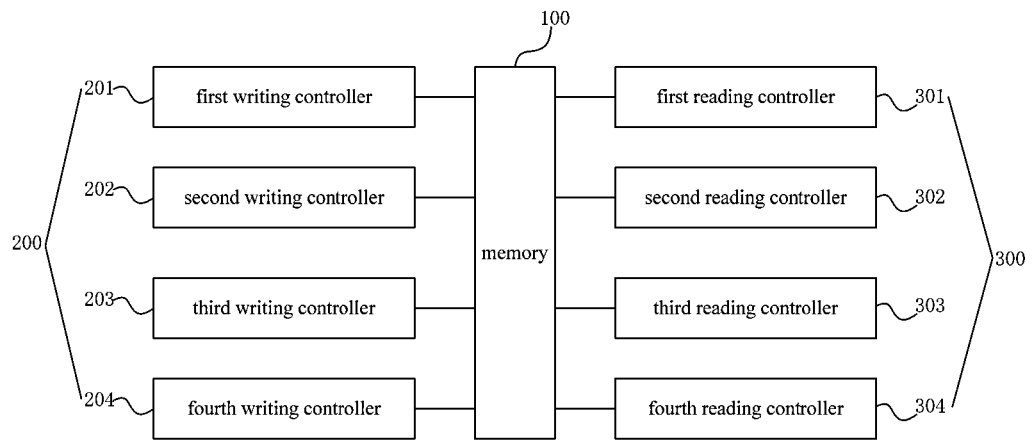
FIG. 1 is a schematic view of an image data processing device according to a first embodiment of the present disclosure.

Specifically, as shown in FIG. 1, the image data processing device includes: a plurality of writing controllers 200 configured to obtain input data of a plurality of image blocks into which a plurality of input images is divided, each writing controller 200 being configured to obtain the input data of one image block in a plurality of image blocks in which each input image is divided, and determine a frame address of the input data stored in a memory 100, and transmit the input data to the memory 100 in accordance with the determined frame address; and a plurality of reading controllers 300, each reading controller 300 being associated with at least one of the writing controllers 200, each reading controller 300 being configured to determine a first frame address, obtain data with a second frame address in the memory 100 in accordance with the first frame address, and output the data with the second frame address, the first frame address being a frame address of the input data currently obtained by the writing controller 200 associated with each reading controller 300 in the memory, and the second frame address being spaced apart from the first frame address by a predetermined quantity of frame addresses.

In a possible embodiment of the present disclosure, the writing controllers 200 and the reading controllers 300 may each be a Field Programmable Gate Array (FPGA) chip coupled to the memory 100 through a circuit line.

In the embodiments of the present disclosure, the quantity of the writing controllers 200 is determined in accordance with the quantity of image blocks into which the input image is divided, and the quantity of the reading controllers 300 is determined in accordance with the quantity of image blocks into which the output image is divided.

Figure 2:
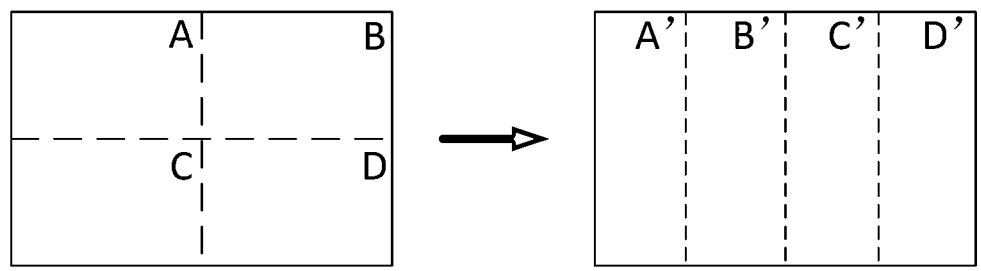
FIG. 2 is a schematic view showing a principle of the conversion between an image segmentation mode of input data and an image segmentation mode of required data.

For example, as shown in FIG. 2, the input images are inputted to the writing controller 200 via four HDMI 2.0 interfaces, and each input image is divided into four image blocks A, B, C and D in a window-like form. When the input images are inputted into a display module, each input image needs to be divided into four image blocks A', B', C' and D' in a fence-line form. In other words, the input data divided in the window-like form needs to be converted into the output data in the fence-like form, i.e., the image segmentation mode of the input data needs to be converted, so as to transmit the output data to a display device.

Figure 4:
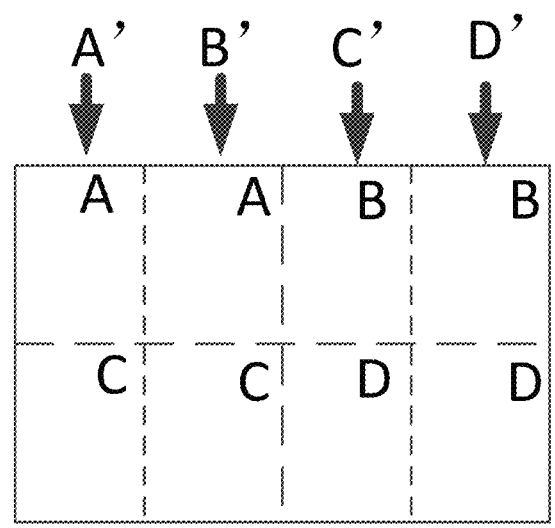
FIG. 4 is a schematic view showing a relationship between the image block segmentation mode of the input data and an image block segmentation mode of output data according to one embodiment of the present disclosure.

Specifically, as shown in FIG. 4, in the four outputted image blocks A', B', C' and D', the image block A' corresponds to a left part of the image block A and a left part of the image block C in the input image, the image block B' corresponds to a right part of the image block A and a right part of the image block C in the input image, the image block C' corresponds to a left part of the image block B and a left part of the image block D in the input end, and the image block D' corresponds to a right part of the image block B and a right part of the image block D in the input image.

In the embodiments of the present disclosure, the quantity of writing controllers 200 is four, and the input data of a corresponding image block of each input image is input to one of the writing controllers 200. With reference to FIGS. 1 and 2, the input data of the image blocks A, B, C and D of each input image are inputted to a first writing controller 201, a second writing controller 202, a third writing controller 203 and a fourth writing controller 204 in the writing controller 200 respectively, and the output data of image block A', B', C' and D' of each output image are read from the memory 100 by a first reading controller 301, a second reading controller 302, a third reading controller 303 and a fourth reading controller 304 respectively and then inputted to a display module for display.

Hence, through the image data processing device with the above-mentioned structure, it is able to achieve the conversion of the image segmentation mode of the input data.

It is able to separately control the plurality of writing controllers 200 to write the input data to the memory 100 and control the plurality of reading controllers 300 to read the output data from the memory 100, so it is able to ensure the data synchronization and the conversion of the frame rate through controlling a timing of the writing and reading when the video data is inputted via a plurality of interfaces.

A specific structure and a specific way of the image data processing device for ensuring the data synchronization, the conversion between the image segmentation mode of the input data and the image segmentation mode of the desired data and the conversion of the frame rate will be described hereinafter in more details.

Figure 3:
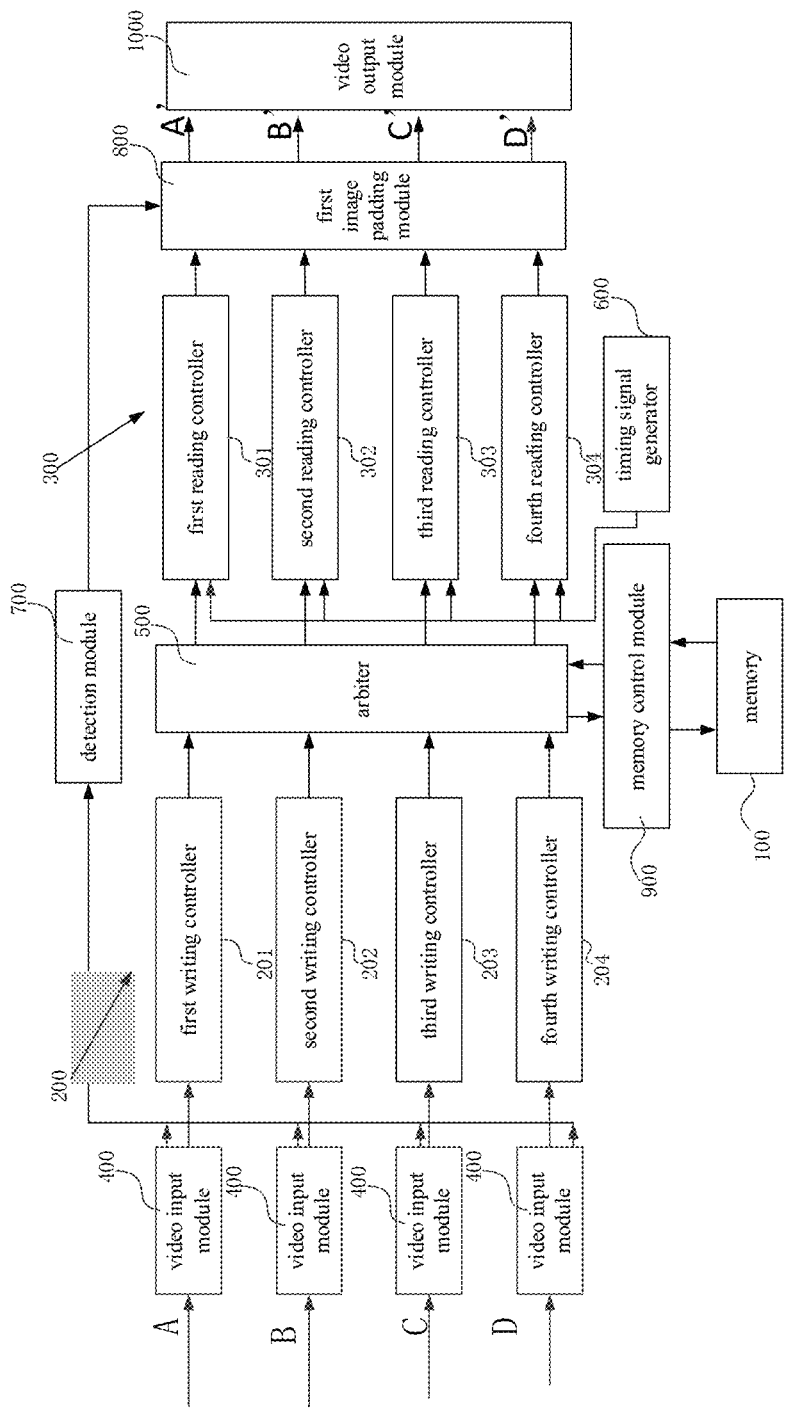
FIG. 3 is a schematic view of an image data processing device according to a second embodiment of the present disclosure.

Referring to FIG. 3, the image data processing device includes the memory 100, the plurality of writing controllers 200 and the plurality of reading controllers 300. In a possible embodiment of the present disclosure, it further includes a video input module 400, an arbiter 500, a timing signal generator 600, a detection module 700, a first image padding module 800, a memory control module 900, and a video output module 1000.

The quantity of video input modules 400 is at least two. Each video input module 400 corresponds to one video input interface, and it is configured to receive a part of to-be-processed data of each input image in accordance with a protocol standard of the video input interface. Specifically, each input image of the inputted video is divided into several parts of to-be-processed data in accordance with the quantity of video input modules 400, and transmitted to the corresponding writing controller 200 through the video input module 400.

A format of the video of the part of to-be-processed data inputted to each video input module 400 may be different from a format of the data capable of being received and processed by the writing controller 200. Thus, the video input module 400 is configured to receive a part of to-be-processed data of each input image and perform format conversion on the part of to-be-processed data to obtain the input data to be transmitted to the corresponding writing controller 200.

For example, the data format of the video inputted to each video input module 400 may be one of RGB, YCbCbr 444, YCbCr422 and YCbCr420, with a bit depth of 8-bit, 10-bit or 12-bit. The video input module 400 may restore the part of to-be-processed data in the above-mentioned format to standard video timing and data (such as a frame synchronization signal, a row synchronization signal, a video data enabling signal and video data), and convert the format of the part of to-be-processed data into the RGB format with a preset bit depth (such as 10-bit).

In the embodiments of the present disclosure, a video interface supported by the video input module 400 includes, but not limited to, High Definition Multimedia Interface (HDMI), DisplayPort (DP), and Low-voltage Differential Signal (LVDS).

In the embodiments of the present disclosure, the writing controller 200 is coupled to the video input module 400, and one video input module 400 is coupled to at least one writing controller 200. The quantity of writing controllers 200 is determined in accordance with the quantity of image blocks into which the input image is divided, and each writing controller 200 obtains the input data of a corresponding image block in each input image through the at least one video input module 400.

In a possible embodiment of the present disclosure, the quantity of writing controllers 200 is the same as the quantity of video input modules 400, and the plurality of writing controllers 200 is coupled to the plurality of video input modules 400 respectively. However, the present disclosure is not limited thereto, as long as the data of a corresponding image block outputted by the at least one video input module 400 is just the data of the corresponding image block inputted into the writing controller 200.

Specifically, the writing controller 200 performs the data format conversion on the received input data of the corresponding image block in units of pixel rows. Pixel line data on which the row format conversion is performed each time may be called as burst data. The writing controller 200 specifies addresses of an image frame, a row and pixels of the input data in the memory 100, and writes the input data of one pixel line in a corresponding image block into the memory 100 in a burst manner (also called as a triggered manner). The reading controller 300 specifies the addresses of the image frame, the row and the pixels to be read in the memory 100. In a possible embodiment of the present disclosure, the output data is read from the memory 100 in a burst manner, and the output data of one pixel line in the corresponding image block is read from the memory 100 each time. The output data read by the reading controller 300 is outputted to a driving chip of the display module through the video output module 1000 for display.

In a possible embodiment of the present disclosure, the image data processing device further includes the arbiter 500 coupled to the memory 100, the writing controller 200 and the reading controller 300, and configured to configure a transmission privilege for each writing controller 200 to write the input data into the memory 100, and configure a transmission privilege for each reading controller 300 to read the output data from the memory 100.

In some embodiments of the present disclosure, the arbiter 500 is implemented as a hardware circuitry. The hardware circuitry includes a conventional very-large-scale integration (VLSI) circuitry, a gate array, an existing semiconductor such as a logic chip and a transistor, or other discrete components.

Specifically, the writing controller 200 configured with the transmission privilege obtains the transmission privilege for writing the input data into the memory 100, so as to write the input data into the memory 100. The reading controller 300 configured with the transmission privilege obtains the transmission privilege for reading the output data from the memory 100, so as to read the output data from the memory 100.

In a possible embodiment of the present disclosure, the memory 100 is a Double Data Rate (DDR) memory coupled to the arbiter 500 through the memory control module 900. When the writing controller 200 and the reading controller 300 are configured with the transmission privilege, the data transmission path between each of the writing controller 200 and the reading controller 300 and the memory control module 900 is enabled, and when the writing controller 200 and the reading controller 300 are not configured with any transmission privilege, the data transmission path between each of the writing controller 200 and the reading controller 300 and the memory control module 900 is disabled.

Based on the above structure, the arbiter 500 is configured to couple the memory 100, the writing controller 200, the reading controller 300 and the memory control module 900 to each other through a bus having a burst function, and then perform arbitration on each reading controller 200 and each reading controller 300 through a certain arbitration mechanism. The arbitrated writing controller 100 and reading controller 300 are configured with the transmission privilege, so as to directly establish a connection with the memory control module 900, and independently occupy the data transmission path with the memory control module 900.

In a possible embodiment of the present disclosure, the writing controller 200 and the reading controller 300 are coupled to the arbiter 500 through a bus supporting a data burst function, e.g., an AXI4-MM bus. The writing controller 200 and the reading controller 300 are arranged at a master end of the bus, and the arbiter 500 is arranged at a slave end of the bus.

A type of the bus between each of the writing controller 200 and the reading controller 300 and the arbiter 500 is the same as a type of the bus between the memory control module 900 and the arbiter 500.

In a possible embodiment of the present disclosure, the arbiter 500 is configured to configure the transmission privileges for the plurality of writing controllers 200 and the plurality of reading controllers 300 in a circularly equal manner, namely, the writing controllers 200 and the reading controllers 300 are equal in the transmission privilege, and they obtain the transmission privileges circularly and equally.

Specifically, the writing controller 200 performs data burst in units of pixel rows, determines such parameters as data bit width and data length in accordance with a pixel data volume in each pixel line, and determines an address of the input data for each pixel line in the memory 100. After obtaining the transmission privilege for writing the data into the memory 100, the writing controller 200 writes the input data for one pixel line into the memory 100, and releases the transmission privilege after one burst. In a possible embodiment of the present disclosure, the data written in each burst is pixel data for one pixel line, and in another possible embodiment of the present disclosure, the data written in each burst is a part of the pixel data for one pixel line. The pixel data for one pixel line may be written into the memory 100 through multiple, e.g., two, burst writing processes.

Identically, the reading controller 300 performs the data burst in units of pixel lines, determines such parameters as data bit width and data length in accordance with the pixel data volume for each pixel line, and determines an address of the output data for each pixel line in the memory 100. After obtaining the transmission privilege for reading the data from the memory 100, the reading controller 300 reads the output data for one pixel line from the memory 100, and releases the transmission privilege after one burst. In a possible embodiment of the present disclosure, the data read in each burst is pixel data for one pixel line, and in another possible embodiment of the present disclosure, the data read in each burst is a part of the pixel data for one pixel line. The pixel data for one pixel line may be read from the memory 100 through multiple, e.g., two, burst writing processes.

In a possible embodiment of the present disclosure, the input data is stored on the basis of pixel lines in each storage sub-space of the memory 100, each pixel line corresponds to a line address, and each pixel in each pixel line corresponds to a pixel address.

A storage space of the memory 100 is divided and organized into a plurality of storage sub-spaces, and each storage sub-space corresponds to a frame address. Further, each storage sub-space includes a line address corresponding to a pixel line and a pixel address corresponding to each pixel. Thus, the storage space within memory 100 includes a Frame Address (FA), a Line Address (LA), and a Pixel Address (PA).

Specifically, the storage space of the memory 100 is divided into n storage sub-spaces, one image is stored in each storage sub-space, and each storage sub-space corresponds to one frame address. For example, a frame address corresponding to a first storage sub-space is 1, a frame address corresponding to a second storage sub-space is 2, . . . , and a frame address corresponding to an $n^{th}$ sub-space is n. In a possible embodiment of the present disclosure, in each storage sub-space, the input data is stored on the basis of pixel lines, and each pixel line corresponds to one line address. For example, a line address corresponding to a first pixel line of the input data is 0, a line address corresponding to a second pixel line is 1, . . . , and a line address corresponding to an $H^{th}$ line is H−1. In a possible embodiment of the present disclosure, each pixel in each pixel line corresponds to one address, i.e., one pixel address. For example, a pixel address corresponding to a first pixel in each pixel line is 0, a pixel address corresponding to a second pixel is 1, . . . , and a pixel address corresponding to an $L^{th}$ pixel is L−1.

In a possible embodiment of the present disclosure, there is a mapping relationship between each of the frame address, the line address and the pixel address and a physical address of the memory 100, and the mapping relationships between the frame address and the physical address of the memory 100, between the line address and the physical address of the memory 100, and between the pixel address and the physical address of the memory 100 are different. For example, the frame address may be mapped to a bank address of the memory 100, and the line address may be mapped to a line address of the memory 100.

In the embodiments of the present disclosure, the memory control module 900 may interface with the memory 100, perform initialization and management on the memory 100, convert the bus burst data into data meeting the requirement on the interfacing with the memory 100, and perform burst access of the data in the memory 100.

In a possible embodiment of the present disclosure, the image data processing device further includes a timing signal generator 600 coupled to each reading controller 300, and configured to input a timing signal to each reading controller 300, so that the reading controller 300 outputs the output data from the memory 100 in response to the timing signal.

Based on the above structure, the timing signal generator 600 transmits the timing signal to each reading controller 300, so that the reading controller 300 transmits output data to the display module in accordance with the timing signal. In this way, it is able to ensure that a timing sequence of the output data transmitted by the reading controller 300 to the display module meets the requirement on a data input frequency of the display module, thereby to ensure that a plurality of pieces of output data read by the reading controllers 300 and belonging to a same frame is transmitted to the display module synchronously.

In a possible embodiment of the present disclosure, as shown in FIG. 3, the image data processing device further includes a detection module 700 and a first image padding module 800.

The detection module 700 is configured to detect whether the input data inputted to each writing controller 200 is abnormal data.

The first image padding module 800 is coupled to the detection module 700 and each reading controller 300, and configured to obtain data outputted by each reading controller 300, and output the data of an image block corresponding to a target frame in the form of preset padding image data when the detection module 700 determines that the input data of the image block inputted to the writing controller 200 and corresponding to the target frame is the abnormal data, or configured to output the preset padding image data when the detection module 700 determines that the input data currently inputted to the writing controller 200 is the abnormal data and the reading controller 300 has stopped obtaining the data in the memory 100. In a possible embodiment of the present disclosure, the detection module 700 detects whether the input data inputted by each video input module 400 is abnormal data, and contents to be detected include whether the video input module 400 is online (i.e., whether the video input module 400 is linked to a play resource), and whether a resolution and a frame rate of the input data are abnormal.

When the detection module 700 determines that the input data of the image block inputted to the writing controller 200 and corresponding to the target frame is the abnormal data, the first image padding module 800 outputs the data of the image block corresponding to the target frame in the form of the preset padding image data, for example, pads a display region of the image block corresponding to the target frame with black, so as to prevent the image from being displayed in an erroneous format, thereby to prevent the occurrence of a blurred screen, flickering and distortion.

In a possible embodiment of the present disclosure, in the case that the first image padding module 800 is configured to obtain the data outputted by each reading controller 300, and output the data of the image block corresponding to the target frame in the form of the preset padding image data when the detection module 700 determines that the input data of the image block inputted to the writing controller 200 and corresponding to the target frame is the abnormal data, the first image padding module 800 is further coupled to the writing controller 200, the writing controller 200 is further configured to output a frame address of the image block corresponding to the target frame in the memory 100 to the first image padding module 800, and the first image padding module 800 is configured to determine the data of the image block outputted by the reading controller 300 and corresponding to the target frame in accordance with the frame address of the image block corresponding to the target frame in the memory 100.

Based on the above, the first image padding module 800 determines the data of the image block outputted by the reading controller 300 and corresponding to the target frame in accordance with the frame address of the target frame for the abnormal data determined by the writing controller 200 in the memory 100, and outputs the preset padding image data. The frame address of the data read by the reading controller 300 from the memory 100 follows the frame address of the data written by the associated reading controller 200 into the memory 100. For example, the first image padding module 800 pads the display region of the image block corresponding to the target frame with black, so as to prevent displaying the image in an erroneous format.

In another embodiment of the present disclosure, when the detection module 700 determines that the input data currently inputted to the writing controller 200 is abnormal data, the first image padding module 800 is configured to control the reading controller 300 to stop obtaining the data in the memory 100, and output the preset padding image data until the detection module 700 determines that the input data inputted to the writing controller 200 is normal. Based on the above, it is able for the first image padding module 800 to determine the preset padding image data when the data is outputted by the reading controller 300, and prevent displaying the image in an erroneous format.

Figure 5:
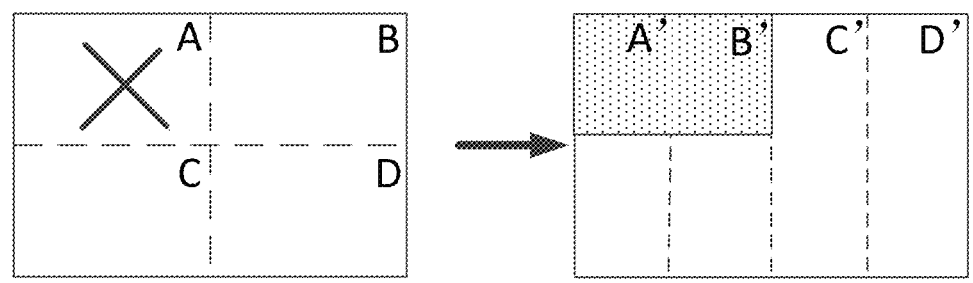
FIG. 5 is a schematic view showing a principle of outputting, by a first image padding module, preset padding image data according to one embodiment of the present disclosure.

In the embodiments of the present disclosure, the detection module 700 may detect whether a part of the input data of the image block corresponding to the target frame is the abnormal data. When a part of the input data of the image block corresponding to the target frame is the abnormal data, the first image padding module 800 may output the preset padding image data with respect to a pixel in the image block corresponding to an image outputted by the reading controller 300 where erroneous data has been detected, and pad an image at a corresponding position with black in accordance with a detection result of the detection module 700. For example, as shown in FIGS. 4 and 5, in the case that a segmentation mode remains unchanged, when a resolution of the image block A is not as expected, e.g., when the resolution or frame rate is abnormal, the first image padding module 800 may pad a part of the image block A' corresponding to the image outputted by the reading controller 300 (i.e., an upper left portion) with black.

In another possible embodiment of the present disclosure, the writing controller 200 is further configured to, when the input data is transmitted to the memory 100 and the input data is the abnormal data, transmit the preset padding image data rather than the input data to the memory or transmit a preset character to the memory in accordance with the determined frame address.

Based on the above, when the input data is the abnormal data, the preset padding image data is written into the memory 100 through the writing controller 200, so that the reading controller 300 directly reads and outputs the preset padding image data, so as to perform the preset image padding when outputting the image. In a possible embodiment of the present disclosure, when the input data is the abnormal data, the writing controller 200 may also write the preset character into the memory 100, so that the reading controller 300 outputs data of the image block corresponding to the target frame in the form of the preset padding image data in accordance with the preset character, so as to prevent displaying the image in the erroneous format.

In a possible embodiment of the present disclosure, the image data processing device further includes a second image padding module (not shown) coupled to the reading controller, and configured to output the data of the image block corresponding to the target frame in the form of the preset padding image data when the output data of the image block outputted by the reading controller and corresponding to the target frame is the preset character. Based on the above, through the reading controller and the writing controller, it is able to control an access address, an access timing and an access speed of the input image and the output image in the memory, thereby to achieve the data synchronization, the conversion between the image segmentation mode of the input and the image segmentation mode of the desired data, and the conversion of the frame rate when the video data is inputted through multiple interfaces.

A specific procedure of achieving the data synchronization, the conversion between the image segmentation mode of the input and the image segmentation mode of the desired data, and the conversion of the frame rate when the video data is inputted through multiple interfaces will be described hereinafter.

As shown in FIG. 3, the input data belonging to a same input image is written by different writing controller 200 to a same frame address in the memory 100. In addition, a procedure of writing, by the writing controller 200, the input data of the input image into the memory 100 is irrelevant to a procedure of reading, by the reading controller 300, the output data of the output image from the memory 100, i.e., a writing procedure of the image data into the memory 100 is separated from a reading procedure of the image data from the memory 100.

Figure 6A:
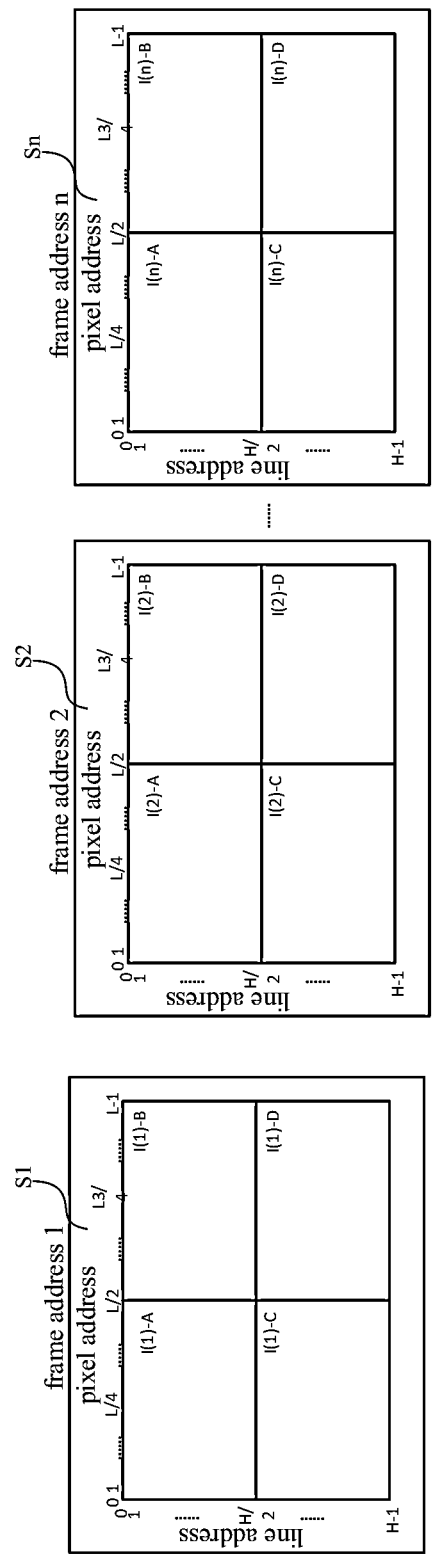
FIGS. 6a and 6b are schematic views showing a reading and writing control method for the image data processing device according to one embodiment of the present disclosure.
Figure 6B:
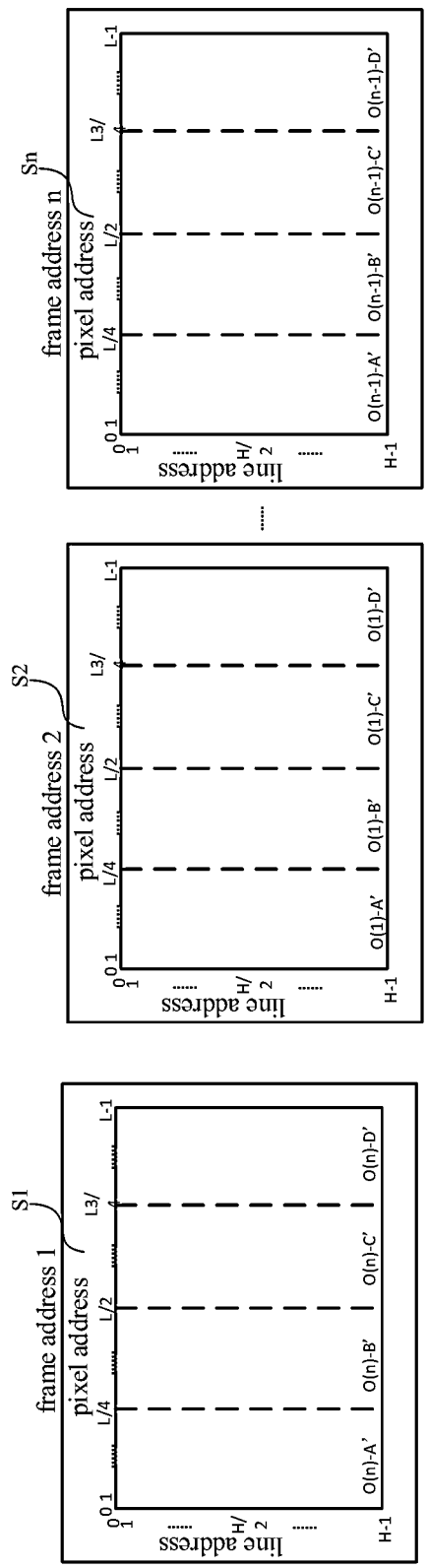

Specifically, as shown in FIGS. 6a and 6b, the storage space of the memory 100 is divided into n storage subspaces, namely, S1, S2, . . . , and Sn. One image is stored in each storage sub-space, and each storage sub-space corresponds to a frame address. In a possible embodiment of the present disclosure, each line address in each storage subspace corresponds to a line address for one pixel line. In a possible embodiment of the present disclosure, each pixel in each pixel line corresponds to one address, i.e., a pixel address. In a possible embodiment of the present disclosure, there is a mapping relationship between each of the frame address, the line address and the pixel address and a physical address of the memory 100, and the mapping relationships between the frame address and the physical address of the memory 100, between the line address and the physical address of the memory 100, and between the pixel address and the physical address of the memory 100 are different. For example, the frame address may be mapped to a bank address of the memory 100, and the line address may be mapped to a line address of the memory 100.

In the embodiments of the present disclosure, the writing procedure of the image data into the memory 100 is separated from the reading process of the image data from the memory 100, namely, the input data of different image blocks of a same input image is written by different writing controllers 200 to a same frame address in the memory 100, i.e., a space corresponding to the same frame address. Based on this, the different image blocks of a same output image are read by the plurality of reading controllers 300 from the memory 100 at the same frame address.

The writing controller 200 writes the input data of each input image to the memory 100 in an ascending order of the frame addresses, the reading controller 300 reads the output data of each output image from the memory 100 in an ascending order of the frame address, and a clock frequency at which the writing controller 200 is triggered to write the input data is synchronized with a clock frequency at which the reading controller 300 is triggered to read the output data.

FIG. 6*a* shows a structural form of an image written by the writing controller 200 into the memory 100. When the input image is divided into four image blocks in a window-like form, in n storage sub-spaces S1, S2, . . . , and Sn, each storage sub-space corresponds to one frame address for storing input data of an image, and the stored the input data of the image is arranged on the basis of pixel lines, so that the input data corresponding to the four image blocks A, B, C and D are stored at each frame address. Four writing controllers 200 correspond to the four image blocks respectively. Each writing controller 200 is configured to read the input data of one image block, and write the input data into a storage pace in the memory 100 corresponding to the image block. To be specific, the input data of the image blocks A, B, C and D stored at a frame address N is I(x)–A, I(x)–B, I(x)–C and I(x)–D, where x is any integer within the range of 1 to n, and n is a maximum quantity of frames of the stored image.

FIG. 6*b* shows a structural form of the image frame read by the reading controller 300 from the memory 100. When the output image is divided into four image blocks in a fence-like form, the four reading controllers 300 correspond to the four image blocks in FIG. 6*b* respectively, so as to read the data of the corresponding image blocks. The output data read by the four reading controllers 300 at a frame address N is O(x)–A', O(x)–B', O(x)–C' and O(x)–D', where x is any integer within the range of 1 to n, and n is a maximum quantity of frames of the stored image.

Specifically, the frame addresses where the input data is written by each writing controller 200 into the memory 100 are gradually incremented by 1. The data burst is performed in units of pixel lines, and after the input data for each pixel line of one input image has been written into the memory 100, a corresponding frame address is incremented by 1, and then the input data of a next input image is written. Identically, the frame addresses where the output data is read by each reading controller 300 from the memory 100 are gradually incremented by 1. The data burst is performed in units of pixel lines, and after the output data of one output image has been read from the memory 100, a corresponding frame address is incremented by 1, and then the output data of a next output image is read.

Based on the above-mentioned image data storage mode, it is able to achieve the conversion between the image segmentation mode of the input data and the image segmentation mode of the desired output data.

To be specific, in the embodiments of the present disclosure, as shown in FIG. 3, each video input module 400 corresponds to one writing controller 200, and each writing controller 400 is configured to write the input data inputted by the corresponding video input module 400 into the storage space of the memory 100. As shown in FIG. 6*a* in combination with FIG. 3, the first writing controller 201 may store the input data inputted by the corresponding video input module 400 at a position I(x)–A, the second writing controller 202 may store the input data inputted by the corresponding video input module 400 at a position I(x)–B, the third writing controller 203 may store the input data inputted by the corresponding video input module 400 at a position I(x)–C, the fourth writing controller 204 may store the input data inputted by the corresponding video input module 400 at a position I(x)–D, and so on, where x is any integer within a range of 1 to n, and n is a maximum quantity of frames of the stored image.

In a possible embodiment of the present disclosure, the writing controller 200 writes the input data of the input image into the memory in a data burst manner, the data for one pixel line is transmitted in each burst, and an address of each burst is an address of a first pixel in the pixel line. For example, a burst address of a pixel in a $p^{th}$ frame and a $q^{th}$ line of the image block B is a frame address p+a line address q+a pixel address L/2, where L is the pixel address. After the completion of the burst in one pixel row, the burst in a next pixel line is performed, so the line address is incremented by 1 until all the pixel lines are written into the memory 100.

After the image has been written into the memory 100, it may be read by the reading controller 300 from the memory 100. As shown in FIG. 6*b*, each reading controller 300 reads a corresponding image block, e.g., the first reading controller 301 reads an image block at a position O(x)–A', the second reading controller 302 reads an image block at a position O(x)–B', the third reading controller 303 reads an image block at a position O(x)–c', the fourth reading controller 304 reads an image block at a position O(x)–d', and so on. Hence, the image segmentation mode of the output image is different from the image segmentation mode of the input image.

Identically, the reading controller 300 reads the image from the memory 100 in a data burst manner, the output data for one pixel line is transmitted in each burst, and an address of each burst is an address of a first pixel in the pixel line. For example, a burst address of a pixel in a $p^{th}$ frame and a $q^{th}$ line of the image block D is a frame address p+a line address q+a pixel address L*¾. After the completion of the burst in one pixel row, the burst in a next pixel line is performed, so the line address is incremented by 1 until all the pixel lines are read from the memory 100.

Based on the above, it is able to write and read the image data when the written image blocks are different from the read image blocks, thereby to convert the image segmentation mode.

In the embodiments of the present disclosure, the conversion of the frame rate may be achieved when the video data is transmitted through multiple interfaces, which will be particularly described hereinafter.

When a frame rate of the input image is greater than a frame rate of the output image and the writing controller sequentially writes the input data of n input images into the memory within a target clock period, the reading controller sequentially reads the output data of m output images from the memory within the target clock period, and stops reading n-m output images after an $m^{th}$ output images, where n is a value obtained by dividing the frame rate of the input image by a target common divisor, M is a value obtained by dividing the frame rate of the output image by the target common divisor, and the target common divisor is a common divisor of the frame rate of the input image and the frame rate of the output image. It should be appreciated that, the common divisor is also an integer capable of being exactly divided by both the frame rate of the input image and the frame rate of the output image. In a possible embodiment of the present disclosure, the target common divisor may be a greatest common divisor of the frame rate of the input image and the frame rate of the output image.

Specifically, the conversion of the frame rate is realized through controlling the quantity of times of reading and writing operations. In the embodiments of the present disclosure, a clock for writing the data by the writing controller 200 and a clock for reading the data by the reading controller 300 are homologous clocks, and a ratio between the clock frequencies is the same as a ratio between the frame rates.

Based on the above, it is necessary to determine the target common divisor of the frame rate of the input image and the frame rate of the output image, divide the frame rate of the input image by the target common divisor to obtain a value n of the frame rate of the input image, and divide the frame rate of the output image by the target common divisor to obtain a value m of the frame rate of the output image. Then, n is compared with m, namely, the frame rate of the input image is compared with the frame rate of the output image, and when n is greater than m and the writing controller 200 sequentially writes the input data of the m input images into the memory 100 within the target clock period, the reading controller 300 sequentially reads the output data of the m output images from the memory 100 within the target clock period, and then the writing controller 200 discards n−m input images after the m$^{th}$ input image.

Specifically, each time n input images are written by the writing controller 200, the reading controller 300 reads m output images correspondingly, and discards n−m input images after the m$^{th}$ input image. For example, when the frame rate of the input image is 60 fps and the frame rate of the output image is 50 fps, the common divisors include 1, 2, 5 and 10. When the target common divisor is 10, i.e., the target common divisor is a greatest common divisor, n is determined as 6 and m is determined as 5. Correspondingly, the writing controller 200 writes the images into the memory 100 in an order of 1, 2, 3, 4, 5 and 6, and the reading controller 300 reads the images from the memory 200 in an order of 1, 2, 3, 4 and 5, and discards a sixth output image.

In another embodiment of the present disclosure, when the frame rate of the input image is less than the frame rate of the output image and the writing controller sequentially writes the input data of n input images into the memory within the target clock period, the reading controller sequentially reads the output data of n output images from the memory within the target clock period, and then reads the last m−n output images in the n output images again within the target clock period, where n is a value obtained by dividing the frame rate of the input image by the target common divisor, M is a value obtained by dividing the frame rate of the output image by the target common divisor, and the target common divisor is a common divisor of the frame rate of the input image and the frame rate of the output image.

In the embodiments of the present disclosure, each time n input images are written by the writing controller 200, the reading controller 300 reads m output images correspondingly. After reading n output images, the reading controller 300 also needs to read the last m−n output images again. For example, when the frame rate of the input image is 50 fps and the frame rate of the output image is 60 fps, the common divisors include 1, 2, 5 and 10. When the target common divisor is a greatest common divisor 10, n is determined as 5, m is determined as 6, and m−n is 1. Correspondingly, the writing controller 200 writes the images, totally 5 images, into the memory 100 in an order of 1, 2, 3, 4 and 5, and the reading controller 300 reads the images, totally six images, from the memory 200 in an order of 1, 2, 3, 4, 5 and 5, i.e., a fifth output image is read again.

Based on the above modes of writing and reading the image data, it is able to realize the conversion of frame rate when the video data is inputted through multiple interfaces.

In the embodiments of the present disclosure, the data synchronization may be achieved when the video data is transmitted through multiple interfaces, which will be particularly described hereinafter.

In order to ensure frame synchronization, the plurality of writing controllers 200 writes the input data of the plurality of image blocks of a same input image simultaneously into a same storage sub-space of the memory 100, namely, an address space having a same frame address. At the same time, the plurality of reading frames 300 is required to read the plurality of image blocks of the image in the same storage sub-space of the memory 100 simultaneously, and the reading controller 300 is driven at a same video time sequence so as to ensure pixel-level synchronization.

Since the writing controller 200 is directly coupled to the video input module 400, due to the influence caused by an external input, there may be cases where a cable of a certain video input module 400 is unplugged or all the video input modules 400 suddenly stop working. Hence, some methods and mechanisms need to be provided to handle these cases.

In the embodiments of the present disclosure, when the input data is not received by one of the plurality of the writing controllers 200 within a predetermined time period, the writing controller 200 determines a next frame address where the input data is stored by the other writing controller in the memory upon the receipt of the input data, and writes the currently-received input data into the next frame address in the memory.

Specifically, when a video cable of one or more video input modules 400 is unplugged or the input of the video signal is stopped, the corresponding writing controller 200 stops a writing operation on the memory 100, and the updating of a current data writing address in the memory 100 is stopped and maintained at a certain address space. The writing controller 200 corresponding to the other normal video input module 400 still writes the data into the memory 100, and the writing address is updated continuously. In this way, writing frame addresses for the input data corresponding to different video input modules 400, i.e., input interfaces, may be different. When the video cable is plugged, the image blocks are written into different storage sub-spaces through different input interfaces, and thereby frame asynchronization may occur. In order to prevent the occurrence of the frame asynchronization, when the input of the data is recovered for an interface, the corresponding writing controller 200 must follow the frame address used by the writing controller 200 corresponding to a video input module which operates normally. For example, when video input modules A and C stop the inputting of the video and video input modules B and D operate normally, the corresponding writing controllers A and C stop writing the image data into the memory, and the frame address is maintained at a. The corresponding writing controllers B and D continue to writing the image data into the memory, and the frame address is updated continuously. When the frame address is updated to b, the video input modules A and C operate again. At this time, the writing controllers A and C use a frame address c rather than the frame address a to write the video data into the memory. The writing controllers B and D also input the data to the frame address c, so it is able to achieve the data synchronization when the video data is inputted through multiple interfaces.

In a possible embodiment of the present disclosure, when all video input modules stop working and then operate at the same time, all the writing controllers may use the frame address corresponding to any one of the writing controller. When all the video input modules operate sequentially again, the writing controller corresponding to a first video input module may write the data to a next frame address of a frame address where the input of data was stopped previously, and a frame address for each of the other writing controllers may follow a frame address of a previous writing controller.

Based on the above, it is able to achieve the data synchronization when the video data is inputted through multiple interfaces. However, the writing controllers 200 must write the input data of a same input image to a same frame address in the memory 100.

For the image data processing device in the embodiments of the present disclosure, apart from the above-mentioned mode where the process of reading, by the reading controller 300, the data from the memory 100 is irrelevant to the process of writing, by the writing controller 200, the data into the memory 100, the data synchronization, the conversion between the image segmentation mode of the input data and the image segmentation mode of the desired data and the conversion of the frame rate may also be achieved through a mode where a predetermined quantity of frame addresses are maintained between the data output of the plurality of reading controllers and the data input of the plurality of associated writing controllers.

In the embodiments of the present disclosure, the storage space of the memory 100 is divided into n storage sub-spaces, one image is stored in each storage sub-space, and each storage sub-space corresponds to one frame address. In a possible embodiment of the present disclosure, each pixel in each pixel line corresponds to one address, i.e., a pixel address.

In the embodiments of the present disclosure, different writing controller 200 may write the input data of a same input image into a same frame address, or different frame addresses, in the memory 100.

In the embodiments of the present disclosure, each reading controller 300 is associated with at least one writing controller 200, and configured to determine the first frame address, obtain data with the second frame address in the memory 100 in accordance with the first frame address, and output the data with the second frame address. The first frame address is a frame address of the input data currently obtained by the writing controller 200 associated with each reading controller 300 in the memory 100, and the second frame address is spaced apart from the first frame address by a predetermined quantity of frame addresses. Based on the above, after the writing controller 200 associated with the reading controller 300 writes the input data with the first frame address into the memory 100, the reading controller 300 may read the output data with the second frame address from the memory 100, and the first frame address is spaced apart from the second frame address by the predetermined quantity of frame addresses.

Based on the above, the frame address where the data is read by the reading controller 300 from the memory 100 follows the frame address where the data is written by the writing controller 300 into the memory 100. Hence, the frame address where the output data is read by the reading controller 300 from the memory 100 may be determined merely through determining the writing controller 200 associated with the reading controller 300 and determining the frame address where the input data is currently written by the associated writing controller 200 into the memory 100. Hence, different writing controllers 200 are not required to write the input data of a same input image into a same frame address in the memory 100, i.e., the frame address where the same input image is stored in the memory is not limited. The frame address where the data is read by the reading controller 300 from the memory 100 follows the frame address where the data is written by the associated writing controller 200 into the memory 100, so the image blocks outputted by the plurality of reading controllers 300 may belong to a same image, i.e., it is able to achieve the synchronization of the output image in a simple manner.

Figure 7:
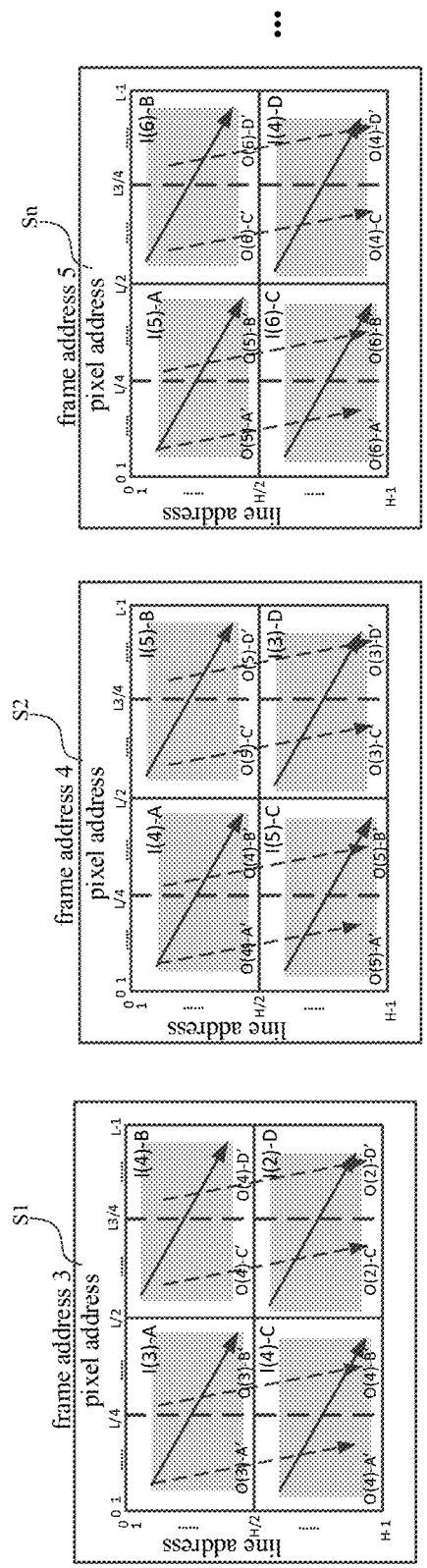
FIG. 7 is a schematic view showing another reading and writing control method for the image data processing device according to one embodiment of the present disclosure.

As shown in FIG. 7, for example, when the storage space of the memory 100 is divided into n storage sub-spaces S1, S2, . . . , and Sn, based on the above, for an image 4, an image block I(4)-A is written into the storage sub-space with a frame address 4, an image block I(4)-B and an image block I(4)-C are written into the storage sub-space with a frame address 3, and an image block I(4)-D is written into the storage sub-space with a frame address 5.

The frame address where the image is read by the reading controller 300 from the memory 100 follows the frame address where the image is written by the writing controller 200 onto the memory 100, and the writing controller 200 is selected in accordance with an image span.

Specifically, each reading controller 300 is associated with at least two writing controllers 200, the image block corresponding to data obtained by the reading controller 300 includes a first image sub-block and a second image sub-block and does not include a third image sub-block and a fourth image sub-block, the image block corresponding to the input data obtained by a first writing controller associated with the reading controller 300 includes the first image sub-block and the third image sub-block, and the image block corresponding to the input data obtained by a second writing controller associated with the reading controller includes the second image sub-block and the fourth image sub-block.

For example, as shown in FIG. 4, when the image block corresponding to the data obtained by the reading controller 300 is A', the image block A' includes a left part of the image block A (a first image sub-block) and a left part of the image block C (a second image sub-block), and does not include a right part of the image block A (a third image sub-block) and a right part of the image block C (a fourth image sub-block). The image block A corresponding to the input data obtained by the first writing controller associated with the reading controller 300 includes the first image sub-block and the third image sub-block, and the image block C corresponding to the input data obtained by the second writing controller associated with the reading controller includes the second image sub-block and the fourth image sub-block.

Hence, the reading controller 300 for reading the image block A' is associated with two writing controllers (the writing controller for the image block A and the writing controller for the image block C).

Based on the above principle, the writing controller associated with each reading controller may be determined in accordance with the image segmentation mode of the input data and the image segmentation mode of the output data in FIGS. 2 and 4, which will not be particularly defined herein.

Specifically, the writing controller 200 associated with the reading controller 300 is determined in accordance with a correspondence between the image blocks of the image corresponding to the reading controller 300 and the image blocks of the image corresponding to the writing controller 200. When the image blocks corresponding to the reading controllers 300 are distributed in the image blocks of different writing controllers 200, the writing controller 200 including each part of the image blocks corresponding to the reading controller 300 is the writing controller 200 associated with the reading controller 300.

For example, as shown in FIG. 7, the image block A' corresponding to the output data of the reading controller 300 is distributed in the image blocks A and C of the input data of the writing controller 200. Hence, a reading frame address for the reading controller 300 corresponding to the image block A' follows writing frame addresses of the writing controllers 200 corresponding to the image blocks A and C, and different parts of the image block correspond to different writing controllers 200. For example, when reading an upper part of the image block A', the frame address for the reading controller 300 follows the frame address of the writing controller 200 corresponding to the image block A, and when reading a lower part of the image block A', the frame address of the reading controller follows the frame address of the writing controller corresponding to the image block C.

Specifically, a following mode is provided in such a manner that the second frame address where the reading controller 300 reads the data from the memory 100 is spaced apart from the first frame address where the writing controller 200 writes the data into the memory 100 by the predetermined quantity of frame addresses, i.e., the frame address where the reading controller 300 reads the data from the memory 100 is determined through subtracting the predetermined quantity s of frame addresses (s is one of 1, 2, . . . , and n−1, and n is the total quantity of storage sub-spaces) from the frame address where the writing controller 200 writes the data into the memory 100, and optionally s is 2.

Based on the above-mentioned image data storage mode, it is able to achieve the conversion between the image segmentation mode of the input data and the image segmentation mode of the desired data, which will be particularly described hereinafter.

Each video input module 400 corresponds to one writing controller 200, and each writing controller 200 corresponds to one image block of the input image. Each writing controller 200 is configured to write the input data from the corresponding video input module 400 into the storage space of the storage module 100. Each reading controller 300 corresponds to one image block of the output image, and it is configured to read the output data from the storage space of the storage space 100 based on the above-mentioned following mode.

Specifically, the writing controller 200 writes the input data of the input image into the memory in a data burst manner, and the data for one pixel line is transmitted in each burst. Identically, the reading controller 300 reads the image from the memory 100 in a data burst manner, and the output data for one pixel line is transmitted in each burst. A specific data writing mode and a specific data reading mode have been described hereinabove, and thus will not be particularly defined herein.

Based on the above, for example, as shown in FIG. 7, when a fourth image is written, the writing controllers write the image block A into the storage sub-space with the frame address 4, write the image block B and image block C into the storage sub-space with the frame address 3, and write the image block D into the storage sub-space with the frame address 5. The reading controllers 300 follow the frame addresses for the writing controllers. Presumed that the predetermined quantity s of frame addresses is 2, when reading an upper part of the image, the reading controllers A' and B' may follow the frame address for the writing controller A, and the frame address for the reading controllers A' and B' is 4−2=2; when reading a lower part of the image, the reading controllers A' and B' may follow the frame address for the writing controller C, and the frame address is 3−2=1; when reading the upper part of the image, the reading controllers C' and D' may follow the frame address for the writing controller B, and the frame address is 3−2=1; and when reading the lower part of the image, the reading controllers C' and D' may follow the frame address for the writing controller D, and the frame address is 5−2=3. The data is read and written in a burst manner, and the pixel data for one pixel lien is written or read in each burst. After the completion of the burst for one pixel line, a line address is incremented by 1, until the entire image has been read or written. Hence, the quantity of images read by the reading controller 300 is smaller than the quantity of images written by the writing controller 200 by two, i.e., a second image corresponding to the image blocks of the output image. In addition, it is able to achieve the conversion of the image segmentation modes at the same time.

In the embodiments of the present disclosure, it is able to achieve the conversion of the frame rate when the video data is inputted through multiple interfaces, which will be particularly described hereinafter.

In the embodiments of the present disclosure, during the data writing and reading, the frame address where the image is read by the reading controller 300 from the memory 100 follows the frame address where the image is written by the writing controller 200 into the memory 100, so it is able to achieve the conversion of the frame rate automatically.

In the embodiments of the present disclosure, the reading controller 300 is further configured to: when data is to be obtained from the memory 100 again after the data with the second frame address has been obtained from the memory 100 and when the frame address of the input data currently obtained by the writing controller 200 associated with the reading controller 300 is still the first frame address in the memory 100, repeatedly obtain the data with the second frame address.

Specifically, the two frame addresses are spaced apart from each other by the predetermined quantity s of frame addresses. When the frame rate of the input image is smaller than the frame rate of the output image, a frame address for a next image read by the reading controller 300 may remain unchanged if the frame address for the writing controller 200 does not change and the reading controller 300 has read one image, so as to repeatedly read the image.

In another possible embodiment of the present disclosure, when the frame rate of the input image is greater than the frame rate of the output image, in a process of reading one image by the reading controller 300, the frame address for the writing controller 200 has probably been updated many times (e.g., twice). Hence, when the reading controller 300 reads a next image, the frame address needs to be incremented by the predetermined quantity s of frame address, and the output data at the intermediate frame addresses may be discarded. For example, when s is 2 and the reading controller 300 reads a next image, the frame address may be incremented by 2, and one image in the middle may be discarded.

Hence, based on the above principle, when the reading controller 300 has read the output data with the second frame address from the memory 100 and then reads the output data from the memory 100 again, it may read the output data of the output image with the second frame address repeatedly if the frame address where the input data is written by the writing controller 200 associated with the reading controller 300 into the memory 100 is maintained as the first frame address.

Before the reading controller 300 reads the output data with the second frame address from the memory 100, when the output data with the third frame address has not been read in the memory 100, the reading controller 300 may discard the output data with the third frame address. A time when the writing controller 200 associated with the reading controller 300 transmits the input data with the third frame address is located before a time when the writing controller 200 transmits the input data with the second frame address, i.e., the third frame address is spaced apart from the first frame address by a value greater than the predetermined quantity of frame addresses.

Based on the above, it is unnecessary to provide a synchronous clock for the writing controller 200 and the reading controller 300, nor a same ratio between the clock frequencies and a same ratio between the frame rates.

In the embodiments of the present disclosure, the data synchronization may be achieved when the video data is inputted through multiple interfaces, which will be particularly described hereinafter.

Since the image block read by the reading controller 300 follows the frame address of the image block written by the writing controller 200, the writing controller 200 is not required to write different image blocks of the same image into the same storage sub-space, and the frame addresses of the written image blocks of the same image may be different from each other. In this way, it is unnecessary to achieve the synchronization of the frame addresses between different video input modules. When a video input module stops operating, the updating of the frame address stops too. When the video input module operates again, it may continue to input the image from the frame address where it stops operating.

The frame address for the writing controller 200 may probably change when an image is read by the reading controller 300, so the reading controller 300 needs to latch the frame address for the corresponding writing controller 200 when it starts to read each image, and then determine the frame address for the reading operation through subtracting the predetermined quantity s of frame address from the current frame address for the writing controller 200. During the reading of the image blocks, the latched address is used. In this way, even if the frame address of the writing controller 200 changes, the frame address for the reading controller 300 will not be adversely affected.

Hence, in a process of reading, by the reading controller 300, the output data with the second frame address from the memory 100, when the frame address of the input data currently written by the writing controller 200 associated with the reading controller 300 into the memory 100 changes from the first frame address to the fourth frame address, the reading controller 300 may read the output data with the second frame address until the output data with the second frame address has been read.

According to the image data processing device in the embodiments of the present disclosure, the input data of each image is written by the plurality of writing controllers into the memory and read by the plurality of reading controllers from the memory. As a result, it is able to ensure the data synchronization, the conversion between the image segmentation mode of the input data and the image segmentation mode of the desired data and the conversion of the frame rate when the video data is inputted through multiple interfaces.

The present disclosure further provides in some embodiments a display device, including the above-mentioned image data processing device.

The display device further includes a display module coupled to the image data processing device, and the output data read by the reading controller 300 of the image data processing device is input to the display module for displaying a video image input by the video input module.

According to the display device in the embodiments of the present disclosure, the image data processing devices converts the data from the video input module into the data capable of being inputted into the display module, so as to ensure the data synchronization, the conversion between the image segmentation mode of the input data and the image segmentation mode of the desired data and the conversion of the frame rate when the video data is inputted through multiple interfaces.

Figure 8:
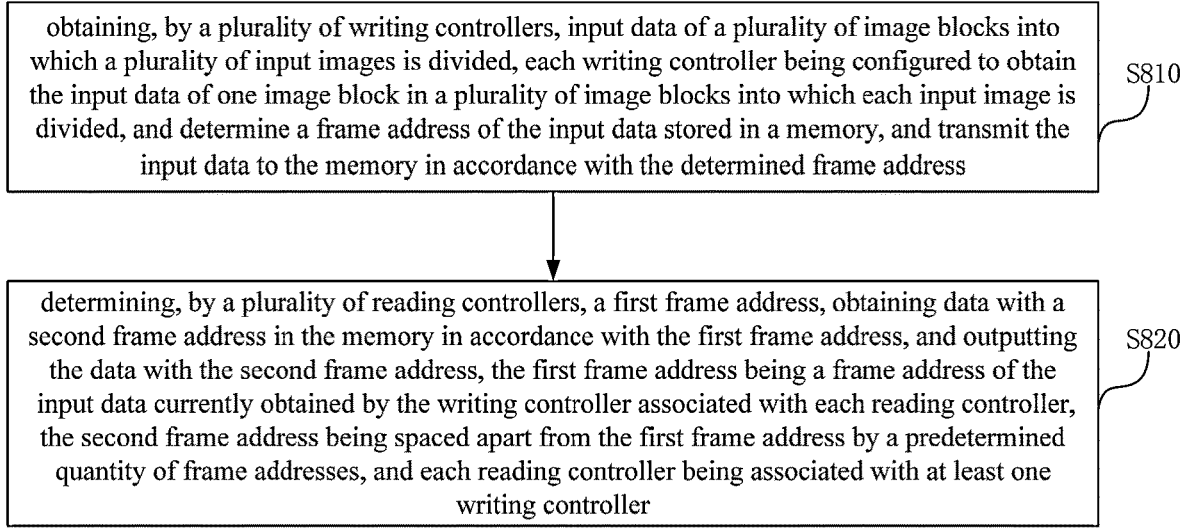
FIG. 8 is a flow chart of an image data processing method according to one embodiment of the present disclosure.

The present disclosure further provides in some embodiments an image data processing method which, as shown in FIG. 8, includes: S810 of obtaining, by a plurality of writing controllers, input data of a plurality of image blocks into which a plurality of input images is divided, each writing controller being configured to obtain the input data of one image block in a plurality of image blocks into which each input image is divided, determine a frame address of the input data stored in a memory, and transmit the input data to the memory in accordance with the determined frame address; and S820 of determining, by a plurality of reading controllers, a first frame address, obtaining data with a second frame address in the memory in accordance with the first frame address, and outputting the data with the second frame address, the first frame address being a frame address of the input data currently obtained by the writing controller associated with each reading controller, the second frame address being spaced apart from the first frame address by a predetermined quantity of frame addresses, and each reading controller being associated with at least one writing controller.

In the embodiments of that present disclosure, modules, units or subunits may be implemented by software to be executed by various types of processors. For example, an identified executable code module may include one or more physical or logical blocks including computer instructions, which may be constructed as an object, process, or function, for example. However, an executable code of the identified module does not need to be physically located together, but may include different instructions stored in different locations that, in a case that the different instructions are logically combined, the instructions constitute the modules and achieve the specified purpose of the module.

A corresponding hardware circuit may be designed by a person skilled in the art to realize the modules, units or subunits, without considering a cost. The hardware circuit includes a conventional Very Large Scale Integrated (VLSI) circuit or a gate array and a related semiconductor such as a logic chip, a transistor, or other discrete elements.

According to the image data processing method in the embodiments of the present disclosure, when inputting the data through the plurality of writing controllers and outputting the data through the plurality of reading controllers, the reading controller may read the data from the memory using a frame address where the data is written by the associated writing controller, and the image blocks outputted by the plurality of reading controllers belong to a same image. As a result, it is able to achieve the synchronization of the output images in a simple manner, and achieve the conversion between the image segmentation mode of the input data and the image segmentation mode of the desired data as well as the conversion of the frame rate.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. An image data processing device, comprising:
   a plurality of writing controllers configured to obtain input data of a plurality of image blocks into which a plurality of input images is divided, each writing controller being configured to obtain the input data of one image block in a plurality of image blocks into which each input image is divided, determine a frame address of the input data stored in a memory, and transmit the input data to the memory in accordance with the determined frame address; and
   a plurality of reading controllers, each reading controller being associated with at least one of the writing controllers, each reading controller being configured to determine a first frame address, obtain data with a second frame address in the memory in accordance with the first frame address, and output the data with the second frame address, the first frame address being a frame address of the input data currently obtained by the writing controller associated with each reading controller in the memory, and the second frame address being spaced apart from the first frame address by a predetermined quantity of frame addresses;
   wherein each reading controller is associated with at least two writing controllers, the image block corresponding to data obtained by the reading controller comprises a first image sub-block and a second image sub-block and does not comprise a third image sub-block and a fourth image sub-block, the image block corresponding to the input data obtained by a first writing controller associated with the reading controller comprises the first image sub-block and the third image sub-block, and the image block corresponding to the input data obtained by a second writing controller associated with the reading controller comprises the second image sub-block and the fourth image sub-block.

2. The image data processing device according to claim 1, wherein the reading controller is configured to, when data is to be obtained from the memory again after the data with the second frame address has been obtained from the memory and when the frame address of the input data currently obtained by the writing controller associated with the reading controller is still the first frame address in the memory, repeatedly obtain the data with the second frame address.

3. The image data processing device according to claim 2, further comprising an arbiter coupled to the memory, the writing controller and the reading controller, and configured to configure a transmission privilege for each writing controller to transmit the input data to the memory, and configure a transmission privilege for each reading controller to read the data from the memory.

4. The image data processing device according to claim 1, wherein the reading controller is configured to, when data with a third frame address has not been obtained yet in the memory before the data with the second frame address is obtained from the memory, stop obtaining the data with the third frame address, and a time when the input data corresponding to the third frame address is transmitted by the writing controller associated with the reading controller is located before a time when the input data corresponding to the second frame address is transmitted.

5. The image data processing device according to claim 4, further comprising an arbiter coupled to the memory, the writing controller and the reading controller, and configured to configure a transmission privilege for each writing controller to transmit the input data to the memory, and configure a transmission privilege for each reading controller to read the data from the memory.

6. The image data processing device according to claim 1, further comprising:
   a detection circuitry configured to detect whether the input data inputted to each writing controller is abnormal data; and
   a first image padding circuitry coupled to the detection circuitry and the reading controller, and configured to obtain data outputted by each reading controller, and output the data of an image block corresponding to a target frame in the form of preset padding image data when the detection circuitry determines that the input data of the image block inputted to the writing controller and corresponding to the target frame is the abnormal data, or configured to output the preset padding image data when the detection circuitry determines that the input data currently inputted to the writing controller is the abnormal data and the reading controller has stopped obtaining the data in the memory.

7. The image data processing device according to claim 6, wherein in the case that the first image padding circuitry is configured to obtain the data outputted by each reading controller, and output the data of the image block corresponding to the target frame in the form of the preset padding image data when the detection circuitry determines that the input data of the image block inputted to the writing controller and corresponding to the target frame is the abnormal data, the first image padding circuitry is further coupled to the writing controller, the writing controller is further configured to output a frame address of the image block corresponding to the target frame in the memory to the first image padding circuitry, and the first image padding circuitry is configured to determine the data of the image block outputted by the reading controller and corresponding to the target frame in accordance with the frame address of the image block corresponding to the target frame in the memory.

8. The image data processing device according to claim 6, further comprising an arbiter coupled to the memory, the writing controller and the reading controller, and configured to configure a transmission privilege for each writing controller to transmit the input data to the memory, and configure a transmission privilege for each reading controller to read the data from the memory.

9. The image data processing device according to claim 1, wherein the writing controller is further configured to, when the input data is transmitted to the memory and the input data is abnormal data, transmit the preset padding image data rather than the input data to the memory or transmit a preset character to the memory in accordance with the determined frame address.

10. The image data processing device according to claim 9, further comprising a second image padding circuitry coupled to the reading controller, and configured to output the data of the image block corresponding to the target frame in the form of the preset padding image data when the output data of the image block outputted by the reading controller and corresponding to the target frame is the preset character.

11. The image data processing device according to claim 1, wherein when the input data has been transmitted to the target frame address in the memory and the input data fails to be received within a predetermined time period, one writing controller in the plurality of the writing controllers receives the input data again and starts to transmit the input data to the memory from a next frame address of the target frame address in the memory.

12. The image data processing device according to claim 1, wherein when the reading controller obtains the data with the second frame address from the memory and the frame address in the memory to which the input data is currently transmitted by the writing controller associated with the reading controller is changed into a fourth frame address, the reading controller is configured to continuously obtain the data with the second frame address until the data with the second frame address has been completely obtained, and the fourth frame address is different from the first frame address.

13. The image data processing device according to claim 1, further comprising an arbiter coupled to the memory, the writing controller and the reading controller, and configured to configure a transmission privilege for each writing controller to transmit the input data to the memory, and configure a transmission privilege for each reading controller to read the data from the memory.

14. The image data processing device according to claim 13, further comprising the memory, wherein the memory is a double data rate memory coupled to the arbiter via a memory controller, and the arbiter is further configured to, when the transmission privilege is configured for the writing controller and the reading controller, enable a data transmission channel between each of the reading controller and the reading controller and the memory controller, and when no transmission privilege is configured to the writing controller and the reading controller, disenable the data transmission channel between each of the reading controller and the reading controller and the memory controller.

15. The image data processing device according to claim 1, further comprising at least two image data input interfaces each coupled to at least one writing controller, and configured to receive a part of to-be-processed data for each input image, and perform format conversion on the part of to-be-processed data to obtain the input data to be transmitted to the writing controller coupled to the image data input interface.

16. The image data processing device according to claim 1, wherein the input data belonging to a same input image is transmitted by different writing controllers to a same frame address in the memory or to different frame addresses in the memory.

17. A display device, comprising a display circuitry and the image data processing device according to claim 1.

18. An image data processing method, comprising:
obtaining, by a plurality of writing controllers, input data of a plurality of image blocks into which a plurality of input images is divided, each writing controller being configured to obtain the input data of one image block in a plurality of image blocks into which each input image is divided, determine a frame address of the input data stored in a memory, and transmit the input data to the memory in accordance with the determined frame address; and
determining, by a plurality of reading controllers, a first frame address, obtaining data with a second frame address in the memory in accordance with the first frame address, and outputting the data with the second frame address, the first frame address being a frame address of the input data currently obtained by the writing controller associated with each reading controller, the second frame address being spaced apart from the first frame address by a predetermined quantity of frame addresses, and each reading controller being associated with at least one writing controller;
wherein each reading controller is associated with at least two writing controllers, the image block corresponding to data obtained by the reading controller comprises a first image sub-block and a second image sub-block and does not comprise a third image sub-block and a fourth image sub-block, the image block corresponding to the input data obtained by a first writing controller associated with the reading controller comprises the first image sub-block and the third image sub-block, and the image block corresponding to the input data obtained by a second writing controller associated with the reading controller comprises the second image sub-block and the fourth image sub-block.

* * * * *